March 9, 1943.  J. EILKEN  2,313,467
RESILIENT COUPLING
Filed Jan. 2, 1941
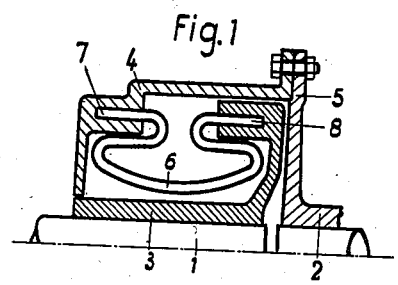
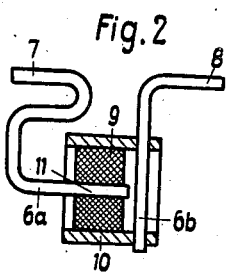
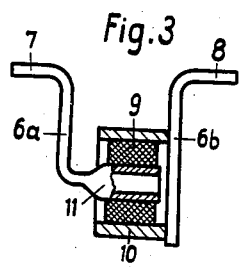
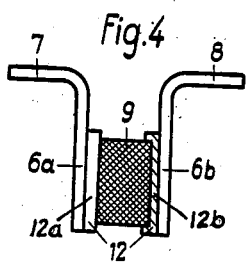
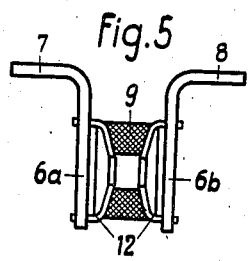
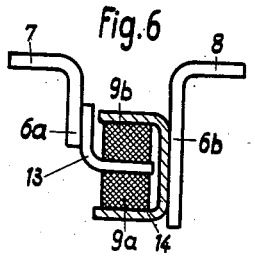
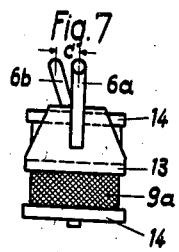
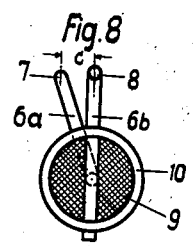
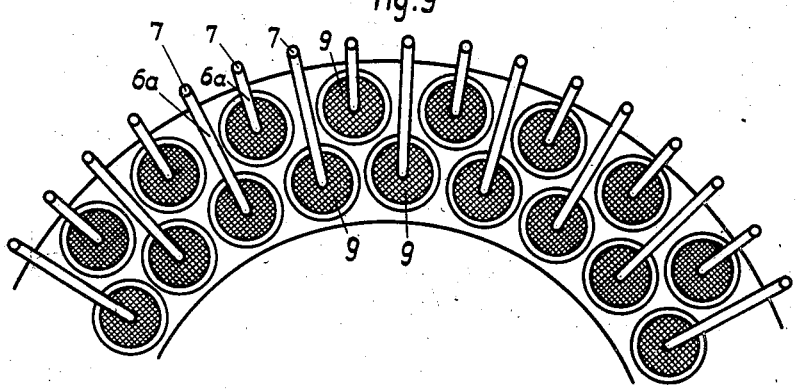
INVENTOR
JOHANNES EILKEN
ATTORNEY.

Patented Mar. 9, 1943

2,313,467

UNITED STATES PATENT OFFICE 2,313,467

RESILIENT COUPLING

Johannes Eilken, Heidenheim-on-the-Brenz, Germany, assignor to American Voith Contact Company Inc., New York, N. Y.

Application January 2, 1941, Serial No. 372,883
In Germany February 7, 1940

5 Claims. (Cl. 64—11)

This invention relates to a resilient and flexible coupling consisting of two coupling halves transmitting the power by flexible members, the oscillations of which are damped.

Flexible couplings transmitting the power between the two coupling parts by loop shaped springs stressed for torsion are well known. The design of these couplings is very simple and the couplings have proven satisfactory but they have the one disadvantage of having only little damping effect against oscillation. Additional damping devices have already been designed for such couplings which were mostly special damping brakes, complicating the coupling, and eliminating the advantage of simple design and increasing the price of the coupling.

According to the invention a damping takes place in a coupling by inserting a damping flexible member, e. g. of rubber or similar material, in the loop shaped spring which is very effective and does not complicate the coupling.

The spring loop together with the damping device is designed as follows: Imagine a normal spring loop cut in the middle; one end of the one half of the loop is fixed against turning in the centre of the rubber cylinder, whereas the adjacent end of the other half of the spring loop is fixed to a cap enclosing the rubber cylinder so that cap and rubber are one solid piece. The two halves of the spring loop and the connecting rubber cylinder with cap are one piece now which is inserted as formerly when the spring loops consisted only of steel, with its two axial ends into the holes of the two coupling halves.

Certain designs of the flexible coupling members damped against oscillations may be chosen to give the steel parts and the rubber parts suitable shapes. One solution is to enlarge the loopable end of the spring to be fixed in the centre of the rubber cylinder into a cylinder of larger diameter to give it a better hold in the rubber. Further the rubber cylinder may not be fixed to the loops in the centre and at its circumference but at its two fronts by discs which carry the two symmetrical parts of the spring loop. The rubber cylinder may be made as well into a ring with a profile in form of a trapezoid. The two front discs are cup shaped, the borders of which are pierced by the pieces of the spring loops which are solidly fixed to them. Or the rubber member consists of two pieces which are fixed below and upon the correspondingly formed end of one of the halves of the spring loops; the end of the other half of the spring loop is U-shaped and encloses above and below the two rubber pieces. It has proved valuable for the quiet run of the coupling to lay the two radial legs of the spring loop, not into one plane but arrange them slightly turned against each other.

In case it is necessary for the transmission of the circumferential force to arrange very many loop springs which do not leave enough space for their rubber cylinders on a common pitch-circle, these rubbers may be arranged in two concentric rows and the radial legs of the loop springs are designed in two different lengths, placing the holes for the axial loop ends in the coupling discs again on one circle.

The drawing shows examples of couplings embodying the invention. The different figures represent:

Figure 1, a schematically longitudinal section through a flexible coupling with completely flexible spring loop, as is known to the art, Figure 2, the schematical design of an improved spring loop with an inserted rubber body, Figures 3–7, spring loops with rubber bodies of different shapes, Figure 8, a spring loop seen in axial direction, Figure 9, the arrangement of the spring loop with rubber bodies arranged in two concentrical rows.

In Figure 1, 1 and 2 are the two shafts to be coupled, 3 is the coupling half on the shaft 1, and 4 and 5 are the coupling half on shaft 2 consisting of two parts. The spring loop 6 connects the two coupling halves 3 and 4 (5) and transmits the power by the spring loop 6, the axial ends of which 7 and 8 are located in the corresponding holes of 3 and 4. The insertion of the flexible rubber body in the spring loop in accordance with the present invention, is visible on Figure 2. The spring loop is composed of the halves 6a and 6b which are united by the rubber body 9. The half 6a is fixed rigidly in the centre of the rubber cylinder, the circumference of which is enclosed by the cap 11 to which the half 6b is fixed. The outer axial ends 7 and 8 of the loop halves 6a and 6b are inserted as usual into the corresponding holes of the coupling halves 3 and 4.

Figure 3 shows the end 11 of the loop half 6a which is enlarged for having a better grip in the rubber cylinder 9. In Figure 4 the cylindrical rubber body 9 is fixed to the loop halves 6a and 6b at its fronts by the discs 12a and 12b. A similar design is shown in Figure 5 in which the rubber body has an annular form.

Figures 6 and 7 show a loop which is fixed with a square shaped split rubber body 9 with its lower part 9a and its upper part 9b to the inner flat shaped part of the loop 6a. In Figure 6, a piece 14 in form of a U encloses the body 9. To the piece 14, the loop half 6b is fixed. Figure 7 as well as Figure 8 shows that the radial legs of the loop halves 6a and 6b form an angle c against each other which is important for the quiet run of the coupling. Figure 9 shows how the rubber bodies 9 are arranged in concentrical rows, the sides 6a of the loop halves leaving in this case two different lengths so that the axial ends 7 of all loops are again on one common circle.

I claim:

1. In a resilient coupling having coupling discs with power transmitting loop members arranged between said discs, the combination of one of said loop members being supported by one of said discs, and having a free end, another of said loop members being supported by the other of said discs and having a free end, both of said loop members forming a pair, and a member interposed between said free ends of said loop members and engaged by the same, for dampening the vibrations of said loop members.

2. In a resilient coupling having coupling discs with power transmitting loop members arranged between said discs, the combination of one of said loop members being supported by one of said discs, and having a free end, another of said loop members being supported by the other of said loop members forming a pair, a member interposed between said free ends of said loop members and engaged by the same, for dampening the vibrations of said loop members, and a holding member for said dampening member interposed between said dampening member and at least one of the ends of said loop members.

3. In a resilient coupling having coupling discs with power transmitting loop members arranged between said discs, the combination of one of said loop members being supported by one of said discs, and having a free end, another of said loop members being supported by the other of said discs and having a free end, both of said loop members forming a pair, and a member interposed between said free ends of said loop members and engaged by the same, for dampening the vibrations of said loop members, said interposed member including a cap on one of said free ends supporting a resilient mass, and a shaft on the other free end engaging the central portion of said interposed member.

4. A resilient coupling as per claim 1, characterized by the fact that the interposed bodies are arranged staggered on two concentric circles and that the radial legs of the loops have correspondingly different lengths, so that the holes in the coupling discs for the axial ends of the loops are all situated again on a common circle, the free ends of the loop members being angularly disposed in respect to each other.

5. In a resilient coupling having coupling discs with power transmitting loop members arranged between said discs, the combination of one of said loop members being supported by one of said discs, and having a free end, another of said loop members being supported by the other of said discs and having a free end, both of said loop members forming a pair, and a member interposed between said free ends of said loop members and engaged by the same, for dampening the vibrations of said loop members, said interposed member being of square-shaped form and engaged by one free end, and a U-formed fixture to hold said square-shaped form engaging the other free end.

JOHANNES EILKEN.